United States Patent [19]

Larson et al.

[11] Patent Number: 4,614,667
[45] Date of Patent: Sep. 30, 1986

[54] COMPOSITE LOW SURFACE ENERGY LINER OF PERFLUOROPOLYETHER

[75] Inventors: James M. Larson, Minneapolis; Allen L. Noreen, Lake Elmo, both of Minn.

[73] Assignee: Minnesota Mining and Manufacturing Company, St. Paul, Minn.

[21] Appl. No.: 796,875

[22] Filed: Nov. 12, 1985

Related U.S. Application Data

[60] Division of Ser. No. 612,475, May 21, 1984, Pat. No. 4,567,073, which is a continuation-in-part of Ser. No. 394,534, Jul. 2, 1982, abandoned.

[51] Int. Cl.$^4$ ............... B05D 3/06; B05D 5/10
[52] U.S. Cl. ............... 427/54.1; 427/208.4; 427/208.8; 427/407.1; 427/412.1; 427/412.5
[58] Field of Search ............... 427/407.1, 54.1, 208.8, 427/208.4, 412.1, 412.5

[56] References Cited

U.S. PATENT DOCUMENTS

| | | | |
|---|---|---|---|
| 2,824,026 | 2/1958 | Homeyer et al. | 427/208.8 |
| 3,318,852 | 5/1967 | Dixon | 260/78.5 |
| 3,536,749 | 10/1970 | Groves | 260/481 |
| 3,778,308 | 12/1973 | Roller et al. | 117/234 |
| 3,810,874 | 5/1974 | Mitsch et al. | 260/75 H |
| 4,050,936 | 9/1977 | Takeda et al. | 96/28 |
| 4,057,596 | 11/1977 | Takemizawa et al. | 260/825 |
| 4,216,252 | 8/1980 | Moeller | 427/387 |
| 4,219,377 | 8/1980 | Albrecht | 156/330 |
| 4,306,954 | 12/1981 | Wendling et al. | 204/159.22 |
| 4,321,404 | 3/1982 | Williams et al. | 560/115 |
| 4,391,844 | 7/1983 | Baczek et al. | 427/44 |
| 4,404,247 | 9/1983 | Dominguez-Burguette et al. | 428/213 |
| 4,419,404 | 12/1983 | Arai et al. | 428/336 |
| 4,472,480 | 9/1984 | Olson | 428/332 |

*Primary Examiner*—Thurman K. Page
*Attorney, Agent, or Firm*—Donald M. Sell; James A. Smith; William G. Ewert

[57] ABSTRACT

Composite low surface energy liner provided by an inner layer of insoluble polymer made from a polymerizable, film-forming monomer and an outer layer of insoluble polymer made from a polymerizable perfluoropolyether monomer copolymerizable with said film-forming monomer, which layers are in-situ polymerized. The compposite low surface energy liner is especially useful as a low-adhesion backsize coating in a pressure-sensitive adhesive tape.

9 Claims, No Drawings

COMPOSITE LOW SURFACE ENERGY LINER OF PERFLUOROPOLYETHER

RELATED APPLICATION

This is a division of application Ser. No. 612,475 filed May 21, 1984, U.S. Pat. No 4,567,073, which is a continuation-in-part of Ser. No. 394,534, filed July 2, 1982, now abandoned.

TECHNICAL FIELD

This invention concerns low surface energy liners having protective, release, or lubricating function, e.g., low-adhesion backsize coatings that permit pressure-sensitive adhesive tapes to be wound upon themselves for storage and later unwound to be put to use.

BACKGROUND ART

Pressure-sensitive adhesive tape which is wound upon itself in roll form has a low-adhesion backsize coating to permit the tape to be unwound without delaminating. If the tape is not wound upon itself, its adhesive is customarily protected by a disposable web which likewise has a low-adhesion coating. Any such low-adhesion coating must both adhere strongly to its underlying substrate and be sufficiently cohesive not to contaminate the adhesive, i.e., not to interfere unduly with its adhesiveness. Low-adhesion backsize coatings are disclosed in U.S. Pat. Nos. 3,318,852, 3,536,749, 4,057,596 and 4,216,252.

Certain pressure-sensitive adhesives are so aggressively tacky that tapes require undesirably high peel forces to be removed from known low-adhesion backsize coatings, especially after prolonged storage. Such tapes may carry away and thus be contaminated by appreciable amounts of the low-adhesion material. It is believed that no release coating of the prior art is fully effective for use with aggressively tacky poly(dimethylsiloxane) pressure-sensitive adhesives.

The need for improved low-adhesion coatings is especially acute for pressure-sensitive adhesive tapes having porous backing such as breathable medical tapes. When such tapes are wound upon themselves into roll form, the pressure-sensitive adhesive may gradually flow into the pores of the backing and thus create a mechanical bond that may cause the adhesive layer to split upon unwinding unless the low-adhesion backsize coating is exceedingly effective. For some such tapes, it has been necessary to employ a nonporous, disposable, low-adhesion web, the cost of which could have been avoided if a better low-adhesion backsize coating were available.

Pressure-sensitive adhesive transfer tapes which are marketed in roll form usually have a carrier web having low-adhesion coatings on both surfaces, one of which provides a lower unwinding force so that the adhesive layer remains on the carrier web during unwinding. If the pressure-sensitive adhesive is highly aggressive, the low-adhesion coating which is to provide the higher unwinding force must accomplish the aforementioned objectives, and the low-adhesion coating which is to provide the lower unwinding force must be even more effective.

Coatings comparable to low-adhesion backsize coatings have other uses, e.g., nonstick coatings for cooking utensils, ice-releasing coatings for aircraft, and lubricative coatings for magnetic recording media. Such low-adhesion coatings are sometimes called "release coatings", a term which also encompasses release agents for molds, which may be effective only by failing cohesively. Lubricants usually function by cohesive failure. To distinguish release coatings which are designed to fail cohesively from those which are designed to resist cohesive failure, the latter are here called "liners" and more specifically, "low-energy liners" because low energy is important to their effectiveness.

DISCLOSURE OF INVENTION

The present invention provides a low surface energy liner which is effective as a low-adhesion coating for use with the most aggressive pressure-sensitive adhesives without unduly diminishing their adhesiveness.

Briefly, the present invention comprises a substrate having a composite liner provided by an inner layer of insoluble polymer made from polymerizable film-forming monomer having a polymerizable functionality greater than 1, and an outer layer of insoluble polymer made from a polymerizable film-forming monomer copolymerizable with the monomer of said inner layer and having a perfluoropolyether segment which is a plurality of polyalkylene oxide, $-C_aF_{2a}O-$, repeating units, where subscript a in each such unit is independently an integer from 1 to 4, which segment preferably has a number average molecular weight of 500 to 20,000.

Said monomers are in-situ polymerized, apparently the contiguous monomers of the 2 layers copolymerizing, thus bonding the perfluoropolyether segments to the substrate through the inner layer.

By polymerizing both layers in their contiguous relationship, the perfluoropolyether segments have significantly greater adherence to the substrate than they would have had the perfluoropolyether monomer been applied directly to the substrate and then polymerized in situ. By virtue of that greater adhesion, the low surface energy liner not only better resists transfer if used as a low-adhesion coating for a pressure-sensitive adhesive, but it becomes highly resistant to removal when subjected to abrasion. Even though the total thickness of the composite may be ultra-thin, the adhered perfluoropolyether provides a barrier or liner which prevents the most aggressive pressure-sensitive adhesives from becoming appreciably bonded to the underlying substrate, even after prolonged storage.

The composite low surface energy liner of the invention may be applied to a substrate by the steps of (a) coating onto the substrate a first dilute solution of said inner layer monomer to provide an inner coating of monomer, (b) coating over the coating of step (a) a second dilute solution of said perfluoropolyether monomer thus providing an outer coating, (c) drying the coatings (to remove solvent) and polymerizing said monomers (which are preferably addition polymerizable), thus bonding the perfluoropolyether segments to the substrate through the inner layer.

When the perfluoropolyether monomer has polymerizable groups containing ethylenic unsaturation such as acryloyl and the monomer of the inner coating has ethylenic unsaturation, polymerization can be effected by ultraviolet radiation, preferably in an inert atmosphere. Preferably there is a photoactive agent in the inner coating, and generally one is necessary in both coatings when the perfluoropolyether monomer has polymerizable groups other than acryloyl. Usually the whole process can be carried out in-line, but some difficulty has been encountered in obtaining a sufficiently inert atmosphere when the outer coating has a thickness greater than 200 nm.

When the perfluoropolyether monomer has hydrolyzable silane, epoxy, or isocyanate polymerizable groups, thermal polymerization can be employed by exposing the coated substrate to thermal radiation in the presence of a polymerization catalyst. When the polymerizable groups are epoxy, ultraviolet radiation may be employed in air in the presence of an aromatic onium salt polymerization catalyst such as diphenyliodonium hexafluoroantimonate or triphenylsulfonium hexafluoroantimonate, incorporated into the coating solution.

The polymers of the inner and outer layers are insoluble, that is, crosslinked, the polymer of the inner layer being insoluble at 20° C. in common organic solvents, e.g. methyl ethyl ketone, and the polymer of the outer being insoluble at 20° C. in 1,1,2-trichloro-2,2,1-trifluoroethane ("Freon" 113).

The thickness of the low surface energy liner is conveniently controlled by the proportion of solvent in the two dilute solutions. Coating techniques useful for in-line processing include brushing, wire or knife coating, spraying, curtain coating and gravure coating. Curtain coating permits essentially simultaneous application of both solutions. If the coating technique used for applying the second solution involves mechanical contact of the inner layer coating, e.g., gravure coating, the inner layer coating preferably is first dried or partially polymerized to develop some abrasion resistance before applying the second solution, and the solvent of the second solution should not be a solvent for the material deposited from the first solution.

The thickness of the inner layer may range from about 10 nm to 0.5 mm. Toward the higher end of that range, the composite low surface energy liner may have better resistance to abrasion, but for some uses it is preferred that the low surface energy liners be as thin as possible, e.g., when used as protective lubricating coatings for magnetic recording media, it being desirable to minimize the spacing between the heads and the magnetizable material of the recording media. Generally the outer layer should be thin, e.g., less than 500 nm, preferably less than 100 nm, because the polyfluoropolyether monomer is exceedingly expensive, and it may be as thin as 5 or 10 nm. On the other hand, the outer layer can be thicker than 500 nm for some uses.

Suitable substrates to which the coating or low surface energy liner can be applied include, for example, paper, glass, steel, aluminum, plastics such as polyester, polyvinyl chloride, non-woven fabrics and the like. For those applications in which the release coated article is to be a pressure-sensitive tape or sheet, it is desirable that the substrate be flexible.

The low surface energy liners of the invention are useful in a variety of other applications such as nonstick coatings for cooking utensils, ice-releasing coatings for aircraft, and lubricative coatings for magnetic recording media.

Suitable perfluoropolyether monomers for making the low surface energy liner of the invention have the formula

wherein Q comprises a polymerizable group attached to a chain of randomly distributed perfluoroalkylene oxide, $-C_aF_{2a}O-$, repeating units, in each of which a is independently an integer of 1 to 4, k is the number of such repeating units and it has a value from 1 to 300 such that the segment preferably has a number average molecular weight of 500 to 20,000, and Z is 13 $OC_aF_{2a+1}$ or Q. If Z is not Q, it preferably is $-OCF_3$, $-OCF_2CF_3$, or $-OCF(CF_3)CF_3$. Typically the perfluoroalkylene oxide units will be $-CF_2O-$, $-C_2F_4O-$, and/or $-C_3F_6O-$.

It is preferred that the perfluoropolyether monomers have functionalities within the range of 1.5 to 2.0 in order to provide covalent bonding at both ends of most of the segments.

Preferred perfluoropolyether monomers are the ethylenically-unsaturated monomers disclosed in U.S. Pat. No. 3,810,874 (Mitsch et al.) and U.S. Pat. No. 4,321,404 (Williams et al.) wherein Q of the above Formula A is selected from

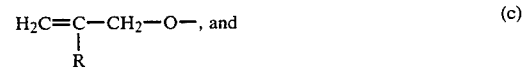

where R is hydrogen or methyl.

These preferred ethylenically-unsaturated perfluoropolyether monomers which have the formula

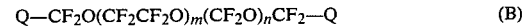

wherein Q is as defined above and m and n designate the number of randomly distributed perfluoroethyleneoxy and perfluoromethyleneoxy backbone repeating units, respectively, n and m having independently values, for example from 1 to 200, and the ratio m/n is 0.2/1 to 5/1.

Examples of polymerizable perfluoropolyether monomers of Formula A useful for making the low surface energy liner of the invention are those of the following where here again, as elsewhere, the perfluoroalkylene oxide units are randomly distributed, the given numbers of which are average values.

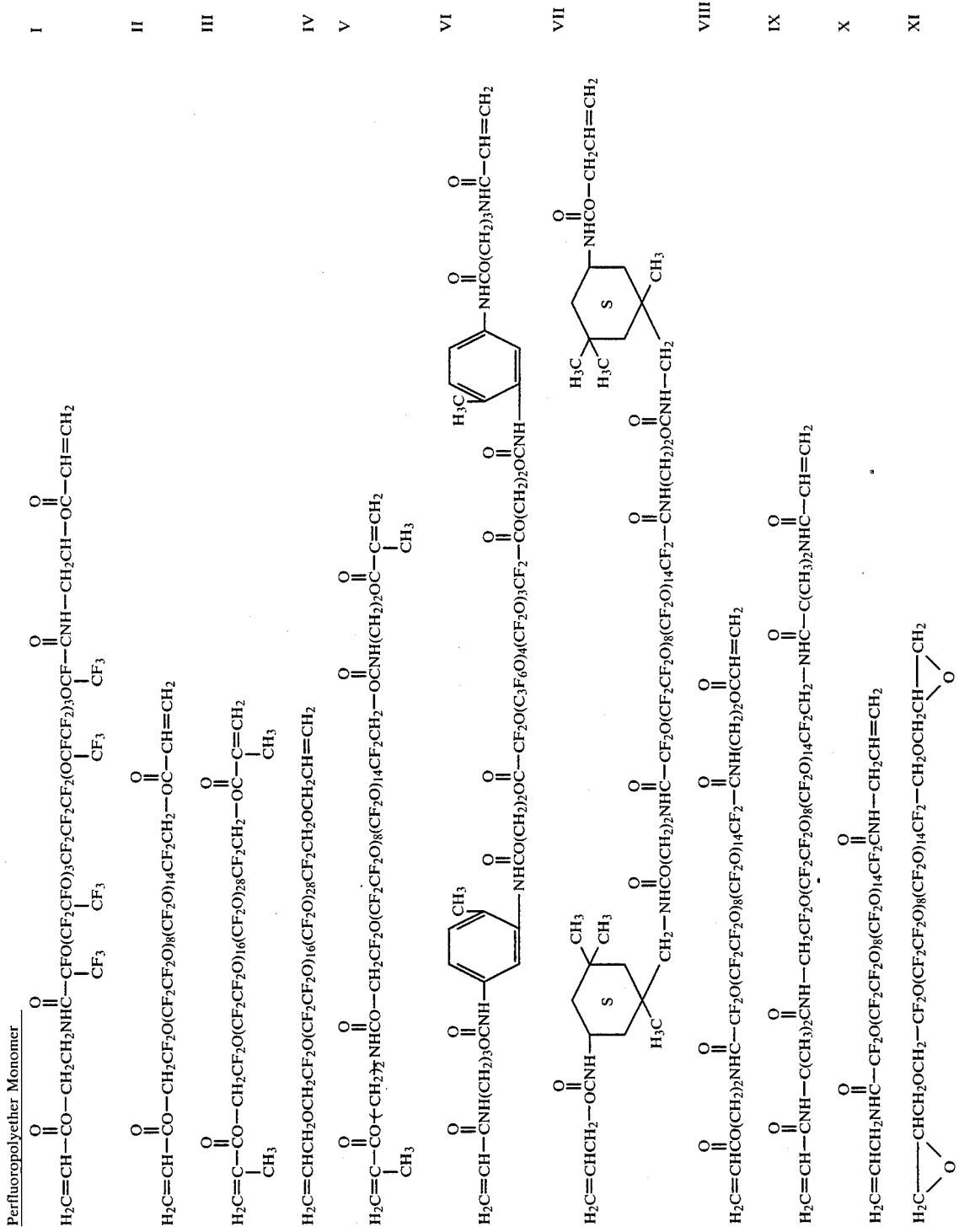

Perfluoropolyether Monomer
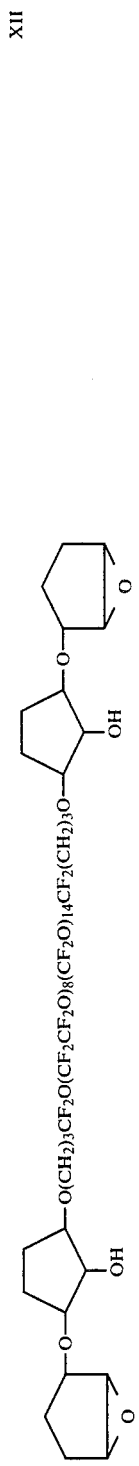
XII
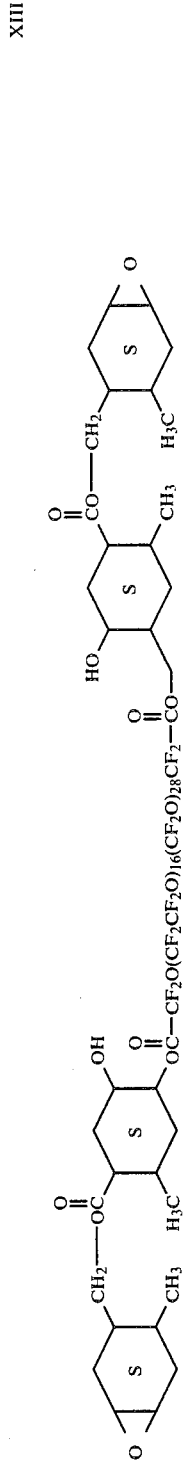
XIII
XIV
XV
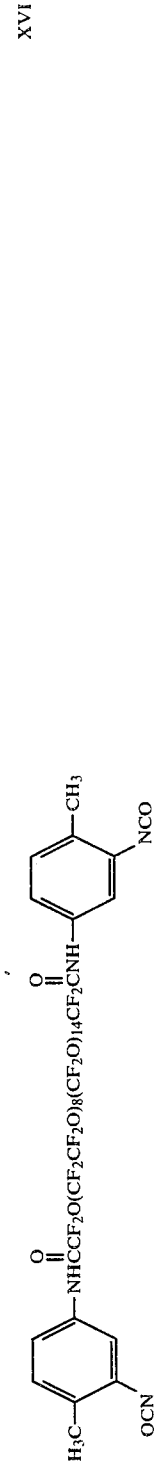
XVI Further description of such monomers, and their preparation, will be omitted in the interest of brevity, the disclosure of said U.S. Pat. Nos. 3,810,874 and 4,321,404 being incorporated herein for such purposes.

In making a low surface energy liner of the invention, one or more other types of copolymerizable monomers with the perfluoropolyether monomer may be dissolved into the solution in amounts providing up to about 20% by weight of the low-energy liner. However, the liner is most effective if the amount of the perfluoropolyether monomer is such that at least 75% of the liner's weight is provided by perfluoropolyether segments. When the perfluoropolyether monomer has polymerizable groups which are ethylenically unsaturated, useful copolymerizable monomers include acrylic and methacrylic esters, amides, and urethanes, and vinyl ethers, epoxides, and heterocycles.

When Q of Formulae A or B is a 1,2-epoxy group, useful copolymerizable monomers include 1,2-epoxy-substituted esters, ethers, siloxanes, and nitriles such as listed in columns 3 and 4 of U.S. Pat. No. 4,219,377.

When Q of Formulae A or B is a hydrolyzable silane group, useful copolymerizable monomers include silanes which may be linear or cyclic and may have alkoxy, halo, cyano, aceto, methacryloxy, lower alkenyl, or phenyl substituents.

When Q of Formulae A or B is an isocyanato group, useful copolymerizable monomers include isocyanates, polyols, and polyamines.

Suitable monomers for use in making the inner layer of the composite, low surface energy liners of the invention are one or more of any film-forming polymerizable monomers containing at least two polymerizable groups (preferably those having ethylenic unsaturation) at least one of which is copolymerizable with that of the monomer used to make the outer layer. Examples of such inner layer monomers are the acrylate and methacrylate esters of alkanepolyols such as 1,6-hexamethylene diacrylate (here called "Inner Layer Monomer A"), pentaerythritol triacrylate (here called "Inner Layer Monomer B"), pentaerythritol tetracrylate (here called "Inner Layer Monomer C"), trimethylolpropane triacrylate (here called "Inner Layer Monomer D"), and dipentaerythritol pentaacrylate (here called "Inner Layer Monomer E"); 1,3,5-tris(2-methacryloyloxyethyl)-s-triazine (here called "Inner Layer Monomer F"); polyesterpolyol acrylate and methacrylates such as

other polyester acrylates and methacrylates as disclosed in U.S. Pat. No. 4,050,936, the heterocyclic polyol acrylates and methacrylates such as

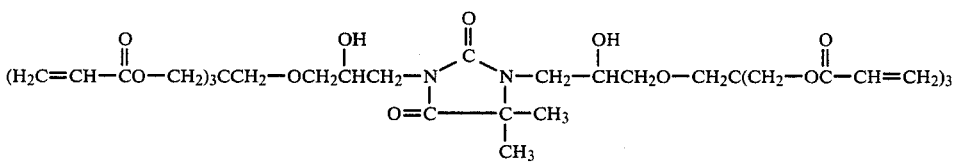

(here called "Inner Layer Monomer G"), 1,3-bis[3-(2-acryloyloxyethoxy)-2-hydropropyl]-5,5-dimethyl-2,4-imidazolidinedione (here called "Inner Layer H"), glycidyl methacrylate, isocyanatoethylmethacrylate, those monomers described in U.S. Pat. No. 4,306,954, and 3-methacryloxypropyltrimethoxysilane; tris(2-methoxyethoxy)vinylsilane; 3,4-epoxycyclohexylmethyl-3,4-epoxycyclohexanecarboxylate; and diallyl phthalate.

EXAMPLE 1

A methyl ethyl ketone solution containing 4.75 parts of a 20/80 mixture of pentaerythritol tetracrylate and Inner Layer Monomer G and 0.25 part 2,4-bis(trichloromethyl)-6-(4-methoxyphenyl)-s-triazine was coated onto 0.074 mm poly(ethyleneterephthalate) film using a wire-wound rod. After allowing the solvent to evaporate to give a calculated dry thickness of 0.35 micrometer, this coating was partially cured by one pass through an ultraviolet processor (PPG Industries, model No. QC 1202 AN 3I) at 61 m/min under an air atmosphere using two medium-pressure mercury lamps at 40 w/cm each. The coating was cured to the point that it was not marked by light pressure with a cotton swab. Perfluoropolyether monomer II was coated onto this partially cured coating from a 0.5% solution in 1,1,2-trichloro-2,2,1-trifluoroethane ("Freon" 113) using a wire-wound rod. After allowing the solvent to evaporate to give a calculated dry thickness of 34 nm, this was passed once through the ultraviolet processor at 31 m/min. under a nitrogen atmosphere using two lamps at 80 w/cm each, thus polymerizing the coatings to provide a composite low surface energy liner of the invention.

The above-prepared liner was evaluated by subjecting it to various tests (which were also used in subsequent examples).

In the "Release Peel Force, Type A Test", a poly(dimethylsiloxane) [DC 355 from Dow Corning which comes as a 18.5% solution in "Freon" 113] was coated onto this composite low surface energy liner using a knife coater and allowed to dry for 2 hours to provide an aggressive pressure-sensitive adhesive layer having a thickness of 0.038 mm. To the adhesive surface was laminated 0.038 mm poly(ethyleneterephthalate) film. After aging the sample at 70° C. (dry heat) for 14 days, the sample was allowed to cool to 22° C. The Release Peel Force required to remove the silicone pressure-sensitive adhesive from the low surface energy liner was measured by peeling off the poly(ethyleneterephthalate) film at an angle of 180° and a peel rate of 2.3 m/min.

In the "Readhesion Peel Force Test", the removed piece of silicone pressure-sensitive adhesive tape was then applied to a clean glass plate and the peel force for its removal measured at a peel rate of 2.3 m/min. and a peel angle of 180°.

In the "Control Peel Force Test", the readhesion value was compared to that obtained from a piece of the silicone pressure-sensitive adhesive tape which had not contacted any surface.

In the "Durability Test", coating durability was determined using a Taber Abraser (from Teledyne Taber, model 503) equipped with CS-O rubber wheels and a 1-kg load. Complete wet-out by the ink from a marking pen (Berol Eagle Marker 8835, black) on the rubbed area was the end point used to indicate substantially complete removal of the coating.

Results from the foregoing tests were:

| | |
|---|---|
| Release Peel Force, Type A | 0.6 N/dm |
| Readhesion Peel Force | 47 N/dm |
| Control Peel Force | 76–79 N/dm |
| Durability | 1100–1200 cycles |

COMPARATIVE EXAMPLE 1

Results for a case identical to Example 1 except that Perfluoropolyether Monomer II was coated directly onto 0.07 mm poly(ethyleneterephthalate) film were:

| | |
|---|---|
| Release Peel Force, Type A | 0.8 N/dm |
| Readhesion Peel Force | 30 N/dm |
| Control Peel Force | 76–79 N/dm |
| Durability | 80–120 cycles |

EXAMPLES 2–9

A number of composite low surface energy liners of the invention were made in the same way as in Example 1 except as indicated in Table A, but in testing, a different type of test was made to determine Release Peel Force. In this test, "Release Peel Force, Type B", a roll of pressure-sensitive adhesive tape was used having an aggressive poly(dimethylsiloxane) pressure-sensitive adhesive (Dow Corning DC 284), 0.025 mm in thickness. Its backing was biaxially-oriented poly(ethyleneterephthalate) film 0.038 mm in thickness and had no backsize coating. The adhesive layer of a piece of the tape was pressed against the low surface energy liner using a smooth plastic bar. After simlulated aging (70° C. for 24 hours) and cooling to 22° C., the underlying film was pressed against a layer of pressure-sensitive adhesive carried by a rigid plate, thus rigidifying the low surface energy liner. The test tape was then peeled back at an angle of 180° and at 2.3 m/min., and the peelback force was measured after the peeling had begun.

Readhesion and Control Peel Forces were determined as in Example 1.

TABLE A

| Example | Inner Layer Monomer | UV Processor Speed (m/min) | Peel Force (N/dm) Release | Peel Force (N/dm) Readhesion | Peel Force (N/dm) Control | Durability (cycles) |
|---|---|---|---|---|---|---|
| 2 | H | 43 | 0.6 | 36–43 | 45 | 400–500 |
| 3 | A | 24[a] | 10 | 36–43 | 45 | 2500–2600 |
| 4 | D | 43[a] | 31 | 31–45 | 45 | 600–650 |
| 5 | B | 49[a,b] | 0.6 | 47 | 45 | 1200–1300 |
| 6 | F | 91[a,b] | 0.6 | 43 | 45 | 400–500 |
| 7 | C | 55[a,b] | 0.6 | 47 | 45 | 1600–1700 |
| 8 | E | 91[a,b] | 0.6 | 44 | 45 | 1600–1700 |

[a]Same as in Example 1 except that inner layer was first partially photocured in a nitrogen atmosphere instead of an air atmosphere.
[b]Same as in Example 1 except that used only one lamp at 40 w/cm.

EXAMPLES 9–11

A number of composite low surface energy liners of the invention were made and tested in the same way as in Example 1 except as indicated in Table B. Additionally comparative liners (denoted by a number followed by "C"), were made by coating the same perfluoropolyether directly onto 0.074 mm poly(ethyleneterephthalate) and testing the comparative liners. Results were:

TABLE B

| Ex. | Formula of Perfluoro polyether used | Outer Layer Thickness (nm) | Peel Force (N/dm) Release* | Peel Force (N/dm) Readhesion | Peel Force (N/dm) Control | Durability (cycles) |
|---|---|---|---|---|---|---|
| 9** | V | 14 | 12.4 | 38 | 39–42 | 300 |
| 9C** | V | 14 | 15 | 34 | 39–42 | 15 |
| 10 | X | 68 | 0.4–1.2 | 43–45 | 39–42 | 1700–2000 |
| 10C | X | 68 | 0.2–0.6 | 34–45 | 39–42 | 20–30 |
| 11 | IV | 68 | 2–6 | 43–45 | 39–42 | 4000–4300 |
| 11C | IV | 68 | 0.2–0.4 | 29–45 | 39–42 | 40–50 |

*Type B
**The coating solution containing the perfluoropolyether monomer also containing 1 part benzildimethylketal photoinitiator per 99 parts of said monomer.

We claim:

1. Method of making a substrate with a liner, comprising the steps of
   (a) coating onto the substrate a first dilute solution of polymerizable, film-forming monomer having a polymerizable functionality greater than 1 to provide an inner coating,
   (b) coating over the coating of step (a) a second dilute solution of a polymerizable, film-forming, monomer copolymerizable with the monomer of said first solution and comprising a perfluoropolyether segment which comprises a plurality of —$C_aF_{2a}O$— repeating units, where subscript a in each such unit is independently an integer from 1 to 4, thus providing an outer coating,
   (c) drying said coatings and copolymerizing said momoners.

2. Method as defined in claim 1 wherein coating step (a) is followed by drying to provide a dry inner coating before coating step (b).

3. Method as defined in claim 2 wherein the inner coating is partially polymerized before coating step (b).

4. Method as defined in claim 1 wherein coating steps (a) and (b) are essentially simultaneous.

5. Method as defined in claim 1 wherein the perfluoropolyether monomer has acryloyl groups and step (c) involves ultraviolet irradiation.

6. Method as defined in claim 5 wherein the irradiation is carried out in an inert atmosphere.

7. Method as defined in claim 1 wherein at least one part of the polyethylenically-unsaturated monomer is coated out in step (a) per one part by weight of the perfluoropolyether coated out in step (b).

8. Method as defined in claim 1 wherein the perfluoropolyether monomer has a functionality of 1.5 to 2.0.

9. Method as defined in claim 1 wherein said polyfluoropolyether monomer has the formula $$Q-(C_aF_{2a}O)_k C_aF_{2a}-Z$$

wherein Q comprises a polymerizable functional group attached to a chain of k randomly connected —$C_aF_{2a}O$— units, in each of which a is independently an integer of 1 to 4, and Z is —$OC_aF_{2a+1}$ or Q.

* * * * *